(12) United States Patent
Sun et al.

(10) Patent No.: US 7,808,532 B2
(45) Date of Patent: Oct. 5, 2010

(54) STRATEGIES FOR EXTRACTING FOREGROUND INFORMATION USING FLASH AND NO-FLASH IMAGE PAIRS

(75) Inventors: Jian Sun, Beijing (CN); Jian Sun, Xi'an (CN); Sing Bing Kang, Redmond, WA (US); Xiaoou Tang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 11/807,448

(22) Filed: May 29, 2007

(65) Prior Publication Data

US 2008/0297621 A1 Dec. 4, 2008

(51) Int. Cl.
H04N 9/73 (2006.01)
(52) U.S. Cl. ............... 348/224.1; 348/370; 348/371
(58) Field of Classification Search .......... 348/224.1, 348/370, 371; 396/3, 171; 382/173, 168–172
See application file for complete search history.

(56) References Cited

U.S. PATENT DOCUMENTS

| | | | |
|---|---|---|---|
| 5,117,283 A | 5/1992 | Kroos et al. | |
| 5,923,380 A | 7/1999 | Yang et al. | |
| 5,940,139 A | 8/1999 | Smoot | |
| 7,330,600 B2 * | 2/2008 | Nishida | 382/274 |
| 2003/0053692 A1 * | 3/2003 | Hong et al. | 382/171 |
| 2003/0081836 A1 * | 5/2003 | Averbuch et al. | 382/199 |
| 2004/0017504 A1 * | 1/2004 | Prandoni et al. | 348/370 |
| 2006/0039690 A1 * | 2/2006 | Steinberg et al. | 396/155 |
| 2007/0237393 A1 * | 10/2007 | Zhang et al. | 382/173 |

FOREIGN PATENT DOCUMENTS

| | | | |
|---|---|---|---|
| JP | 2000023038 A | 1/2000 | |
| WO | WO02100094 A2 | 12/2002 | |

* cited by examiner

Primary Examiner—Jason Whipkey
Assistant Examiner—Don Nguyen
(74) Attorney, Agent, or Firm—Lee & Hayes, PLLC

(57) ABSTRACT

A flash-based strategy is used to separate foreground information from background information within image information. In this strategy, a first image is taken without the use of flash. A second image is taken of the same subject matter with the use of flash. The foreground information in the flash image is illuminated by the flash to a much greater extent than the background information. Based on this property, the strategy applies processing to extract the foreground information from the background information. The strategy supplements the flash information by also taking into consideration motion information and color information.

18 Claims, 10 Drawing Sheets
(7 of 10 Drawing Sheet(s) Filed in Color)

NO-FLASH IMAGE

FLASH IMAGE

BACKGROUND SPARSE MATCHING

SPARSE MATCHING

BACKGROUND PROB. (ALWR AND REFINEMENT)

BACKGROUND PROB. (HOMOGRAPHY)

Result without Background Prob. and Color Considerations

Result without Ratio and Color Considerations

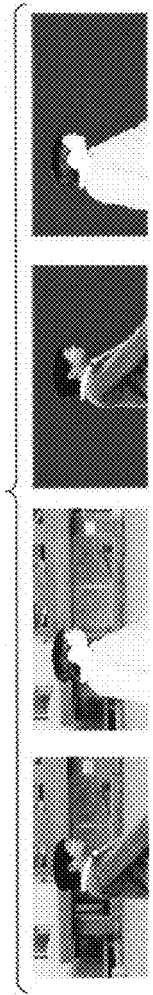
FIG. 10A — Walking Person
FIG. 10B — Statue w/ Moderately Dynamic Background
FIG. 10C — Flower Buds
FIG. 10D — Plant On Windy Day
FIG. 10E — Bamboo Fence
FIG. 10F — Toy Tiger
FIG. 10G — Stone Horse

STRATEGIES FOR EXTRACTING FOREGROUND INFORMATION USING FLASH AND NO-FLASH IMAGE PAIRS

CROSS-REFERENCE TO RELATED APPLICATIONS

This Application is related to co-pending application Ser. No. 11/434,567, entitled "Object Matting Using Flash and No-Flash Images," filed on May 15, 2006, naming the inventors of Jian Sun, et al. This co-pending application is incorporated herein by reference in its entirety.

BACKGROUND

Many applications separate an image into its component parts. In one such case, an application may extract foreground information from background information within an image. The foreground information may correspond to a foreground object while the background information corresponds to a background object; at image capture, the foreground object is closer to an image-capturing device than the background object Different techniques can be used to segment an image. One type of technique segments an image with the manual assistance of a human user. Another type of technique segments an image based, in part, on supplemental information. One variety of the latter type of technique segments an image by analyzing multiple images, such as, in one approach, a sequence of 8-15 frames.

Some image segmentation techniques produce results having unsatisfactory quality. Other image segmentation techniques provide more accurate results, but are relatively complicated to use in practice. It is desirable to provide an image segmentation technique that is both accurate and easy to use.

SUMMARY

A flash-based strategy is used to separate foreground information from background information within image information. In this strategy, a first image is taken without the use of flash. A second image is taken of the same subject matter with the use of flash. The foreground information in the flash image is illuminated by the flash to a much greater extent than the background information. Based on this property, the strategy applies processing to extract the foreground information from the background information. The strategy supplements the flash information by also taking into consideration motion information and color information.

In one illustrative and non-limiting implementation, the strategy extracts foreground information from background information by minimizing the energy E(x) of a Markov Random Field (MRF), where E(x) is:

$$E(x) = \sum_p E_d(x_p) + \alpha \sum_{p,q} E_s(x_p, x_q).$$

In the above expression, $E_d(x_p)$ is a data term for each pixel p in the image information, $E_s(x_p, x_q)$ is a smoothness term associated with two adjacent pixels p and q in the image information, and α is a constant.

The term $E_d(x_p)$, in turn, can be expressed as:

$$E_d(x_p) = \gamma_f E_f(x_p) + \gamma_m E_m(x_p) + E_c(x_p).$$

In the above expression, $E_f(x_p)$ is a foreground flash term. The foreground flash term applies a color histogram of the image information as a global cue. $E_m(x_p)$ is a background flash term. The background flash term models a motion-compensated flash effect on background information within the image information. $E_c(x_p)$ is a color term. The color term models foreground and background color likelihood measures in the image information. The terms $\gamma_f$ and $\gamma_m$ are constants.

Additional exemplary implementations and features are described in the following.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 10A-10G show additional examples of the application of the foreground extraction module.

Figure 1:
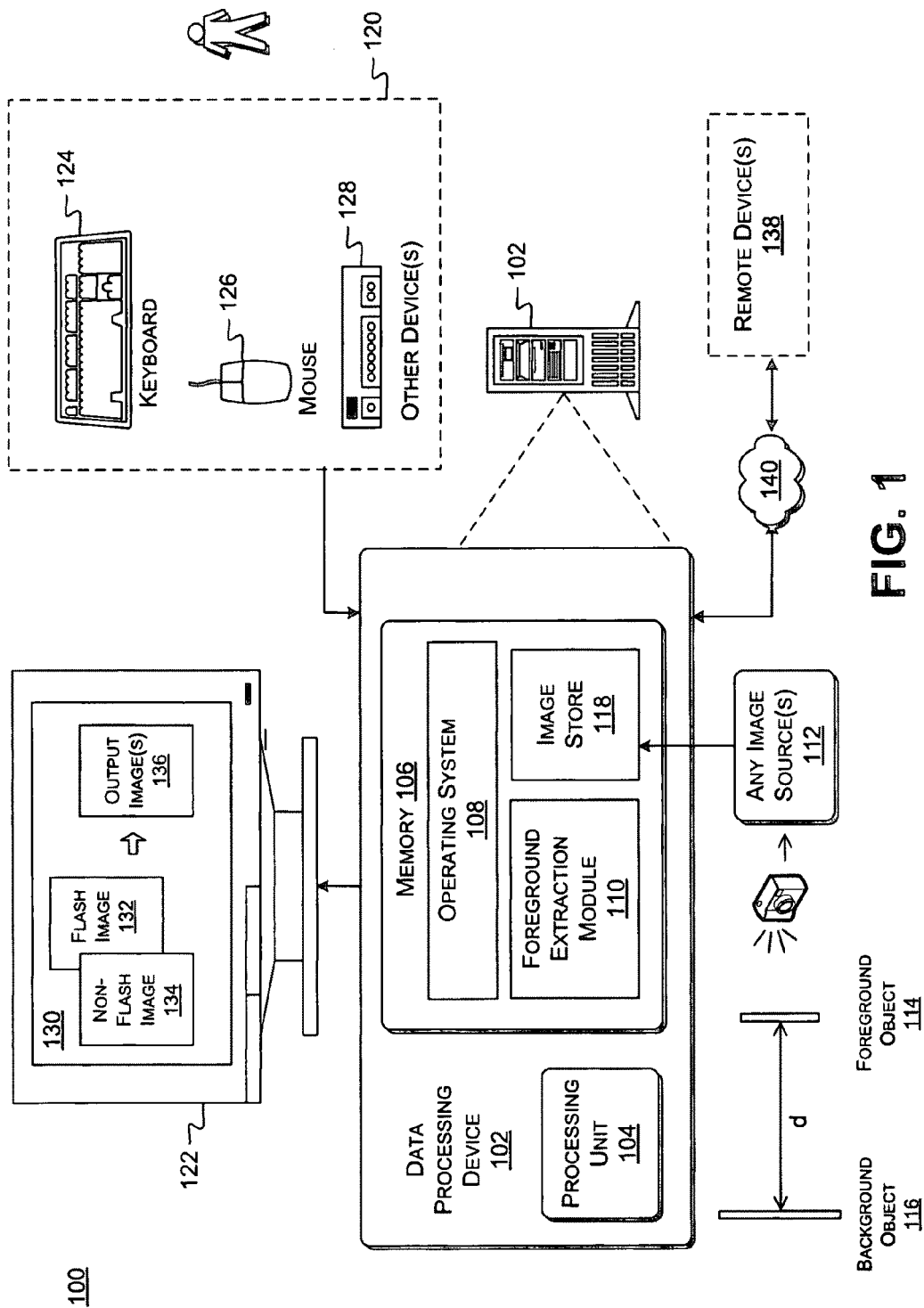
FIG. 1 shows an illustrative system for performing image segmentation using a flash/no-flash pairing of images.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for separating foreground information from background information based on a flash image and a no-flash image. The flash image corresponds to the image-capture of subject matter taken with the use of flash. The no-flash image corresponds to the image-capture of the same subject matter taken without the use of flash, or at least with a reduced amount of flash with respect to the flash image. The strategy can be manifested in various systems, apparatuses, modules, procedures, storage mediums, data structures, and other forms.

The flash image and the no-flash image are collectively referred to herein as a flash/no-flash image pairing. Further, any image information pertaining to the flash/no-flash image pairing is generally referred to as "image information."

The term "foreground information" pertains to any object in the image information that is relatively close to an image capture device (compared to other objects in a scene). The term "background information" pertains to any object in the image information that is relatively distant from the image capture device (compared to the foreground information). An "object," as used herein, can correspond to a single entity; but an "object" can also have multiple parts, such as foreground object corresponding to two or more people, or a fence having multiple distinct pickets, and so forth.

This disclosure includes the following sections. Section A provides an overview of a system for extracting foreground information using a flash/no-flash image pairing. Section B provides an overview of a strategy for extracting foreground information using a flash/no-flash image pairing. Section C describes a foreground extraction module that can be used in the system of Section A. And section D discusses illustrative results produced by the foreground extraction module of Section C.

A. Overview of System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

FIG. 1 shows an example of one system 100 that can be used to implement the foreground extraction strategy described herein. In one non-limiting implementation, the strategy can be implemented by an electronic data processing device 102, such as a personal computer, laptop computer, personal digital assistant, mobile telephone device, game console device, set-top box, and so on. The processing device 102 can include conventional hardware components, such as a processing unit 104 (or plural processing units) and any type (or combination of types) of memory 106. The memory 106 can include an operating system 108 that performs core operating tasks. The memory 106 can also include one or more applications which run "on top" of the operating system 108 and utilize its resources. One such application is foreground extraction module 110. The foreground extraction module 110 implements the foreground extraction strategy described herein. In this illustrated implementation, the foreground extraction module 110 is implemented as machine-readable instructions which perform prescribed operations when these instructions are executed by the processing unit 104. The foreground extraction module 110 can alternatively, or in addition, be implemented by hardware (e.g., discrete logic functionality).

The foreground extraction module 110 can receive images as input. The images can originate from any source 112. One such source is any type of digital camera that is equipped with a flash unit, such as any type of commercially available "off the shelf" camera. The digital camera can capture at least one image of subject matter using flash, and at least one image of the subject matter without flash. The subject matter includes a foreground object 114 and a background object 116, which, upon being captured, contribute to foreground information and background information, respectively. The foreground object 114 can include one integral part or multiple separate parts. The background object 116 can likewise include one integral part or multiple separate parts. The foreground object 114 is closer to the digital camera than the background object 116, and parts of the foreground object 114 are separated from parts of the background object 116 by a distance d. Because of the relationship of the foreground object 114, the background object 116, and the flash unit, the foreground object 114 is generally more affected by the flash than the background object 116. The foreground extraction module 110 uses this property, together with motion information and color information, to separate the foreground information from the background information in the flash/no-flash image pairing. The memory 106 includes an image store 118 for storing the images collected by the image source 112.

A digital still camera is just one type of image source 112. In another case, the image source 112 can comprise a video camera. In another case, the image source 112 can comprise functionality that produces synthesized images. For example, the image source 112 can comprise, in whole or in part, a graphics engine which produces computer-generated images. In another case, the image source 112 may comprise an interface which receives images from some other source. For example, the interface may comprise a local computer interface which receives stored images from a memory device, a network interface which receives images over a network from a remote source, and so forth.

The foreground extraction module 110 produces results based on its processing. These results can take the form of processed images (such as images containing just the foreground information, or images that contain the foreground information pasted onto new background information, and so on). The foreground extraction module 110 can store the results in the image store 118, or in another image store (not shown).

A user can interact with the processing device 102 via one or more input devices 120 and a display device 122 (and/or other form of output device). The input devices 120 can comprise a keyboard 124, a mouse device 126, and/or any other kind of input device 128. The display device 122 can represent any kind of computer monitor, television device, and so on. The display device 122 provides a user interface presentation 130. The user interface presentation 130 can display images that are input to the foreground extraction module 110 and images that are produced by the foreground extraction module 110, and/or other information (not shown), such as command controls, etc. For example, the user interface presentation 130 can present flash/no-flash image pairings (e.g., images 132, 134), output images (e.g., image 136), and any type of intermediary analysis (not shown) produced by the foreground extraction module 110. The user interface presentation 130 can allow the user to interact with processing device 102 by entering instructions, manipulating images, and so on.

The above-described system is not the only way to implement the foreground extraction strategy. In another case, the processing device 102 can represent a server computer that is accessible to one or more remote devices 138 via a network coupling 140. The network coupling 140 can comprise a WAN-type coupling (e.g., the Internet), a LAN-type coupling, or any combination thereof. In this implementation, a user can use the remote device 138 to submit image pairings to the network-accessible data processing device 102. The data processing device 102 can forward the processed results back to the remote device 138. The interaction between the data processing device 102 and remote device 138 can be based on a client/server model, a Terminal Services model, or some other model or combination of models.

B. Overview of Technique

Figure 2:
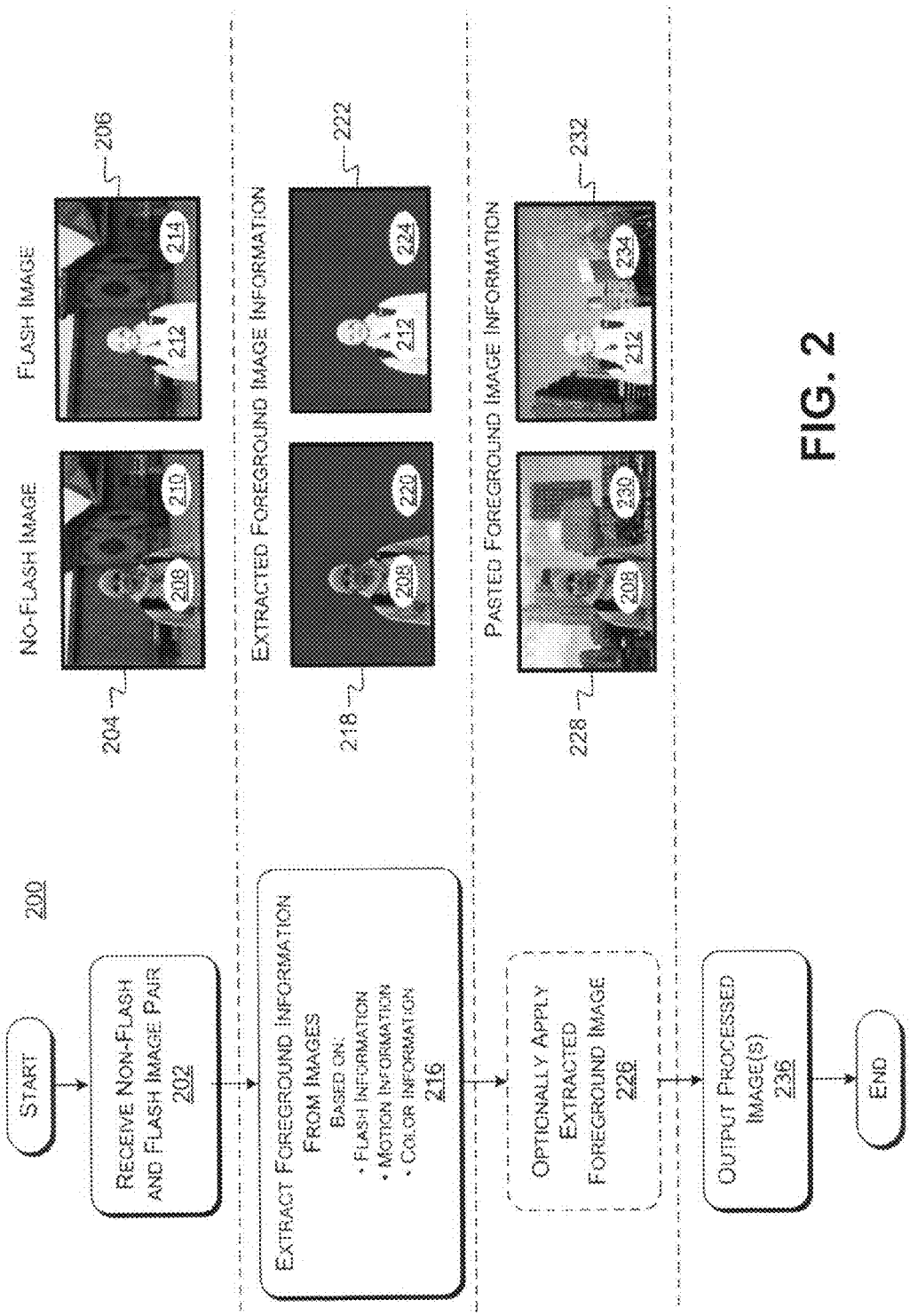
FIG. 2 is a flowchart that shows an illustrative procedure for performing image segmentation using a flash/no-flash pairing of images.

FIG. 2 shows, in flowchart form, a procedure 200 for extracting foreground information based on a flash/no-flash image pairing. In this mode of explanation, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

In block 202, the foreground extraction module 110 receives a flash/no-flash image pairing. The image pairing includes at least one image 204 ($I^{nf}$) taken without the use of flash and at least one image 206 ($I^f$) taken with the use of flash. The foreground extraction module 110 can successfully perform its operation based on these two images (204, 206). However, in another implementation, the foreground extraction module 110 can process one or more additional no-flash images and/or one or more flash images.

The no-flash image 204 is captured without the use of any flash. However, in another implementation, the no-flash image 204 can be captured using flash, but using a weaker intensity of flash compared to the flash image 206. Thus, the terms no-flash image and flash image are to be interpreted broadly herein to refer to any illumination scenario in which one image receives less directed illumination than another image.

The image pairing includes foreground information and background information. For example, the no-flash image 204 includes foreground information 208 and background information 210, while the flash image 206 includes foreground information 212 and background information 214. More specifically, the images (204, 206) capture a scene in which a man, corresponding to the foreground information (208, 212) is standing in front of a building, corresponding to the background information (210, 214). There is a significant distance separating the man and building.

The no-flash image 204 and the flash image 206 are taken close together in time, e.g., in one case, separated by only a few seconds. The user can take the no-flash image 204 first, followed by the flash image 206, or vice versa. Due to this timing, the foreground information and background information should appear similar in both images (204, 206). However, the foreground and background information will not be exactly the same. As can be seen, the foreground information (corresponding to the man) changes slightly, as the man adopts a different facial expression and posture in the flash image 206 compared to the no-flash image 204. The background information may likewise change due to any number of factors. For example, the background object may move (e.g., trees in the background may move with the wind), or the man may change position, revealing a different portion of the background, and so on.

In block 216, the foreground extraction module 110 applies processing to extract foreground information from the image pairing. In doing so, the foreground extraction module 110 exploits the fact that foreground information is affected by the flash more markedly than the background information. This can be seen by comparing the no-flash image 204 with the flash image 206. As shown there, the foreground information 212 in the flash image 206 (corresponding to the man) is noticeably brightened in comparison with the foreground information 208 in the no-flash image 204. In contrast, the background information 214 in the flash image 206 is not noticeably brightened in the flash image 206 in comparison to the background information 210 in the no-flash image 204.

The processing performed in block 216 also takes into consideration motion information and color information. Motion information is a cue that pertains to motion exhibited in the image information, e.g., as manifested in changes between the no-flash image 204 and the flash image 206. Color information is a cue that pertains to distribution of color information in the image information. More specifically, the flash information is exploited globally using histogram analysis and locally with the help of background motion estimation. By virtue of use of these three considerations (flash information, motion information, and color information), the processing performed in block 216 is relatively insensitive to the misalignment caused by camera shake and some foreground object movement. The processing can also handle highly complex objects such as plants and trees. The next section describes in greater detail how the foreground extraction module 110 applies the flash information, motion information, and color information.

The outcome of block 216 is the extraction of foreground information from the image information. For example, as represented by result image 218, the foreground extraction module 110 can extract the foreground information 208 from the non-flash image 204 and present it on synthetic background 220, such as a blue background image. As represented by result image 222, the foreground extraction module 110 can also extract the foreground information 212 from the flash image 206 and place it on a synthetic background 224.

In block 226, the foreground extraction module 110 can perform additional processing on the extracted foreground information. To name one example, the foreground extraction module 110 can paste the extracted foreground information onto new background information. For example, as represented by result image 228, the foreground extraction module 110 can paste the extracted foreground information 208 on new background information 230. As presented by result image 232, the foreground extraction module 110 can paste the extracted foreground information 212 onto new background information 234.

In block 236, the foreground extraction module 110 outputs the results of its processing. For example, the foreground extraction module 110 can display the results of its processing, and/or store the results of its processing, and/or transfer the results of its processing to a target destination, and so forth.

C. Foreground Extraction Module

Figure 3:
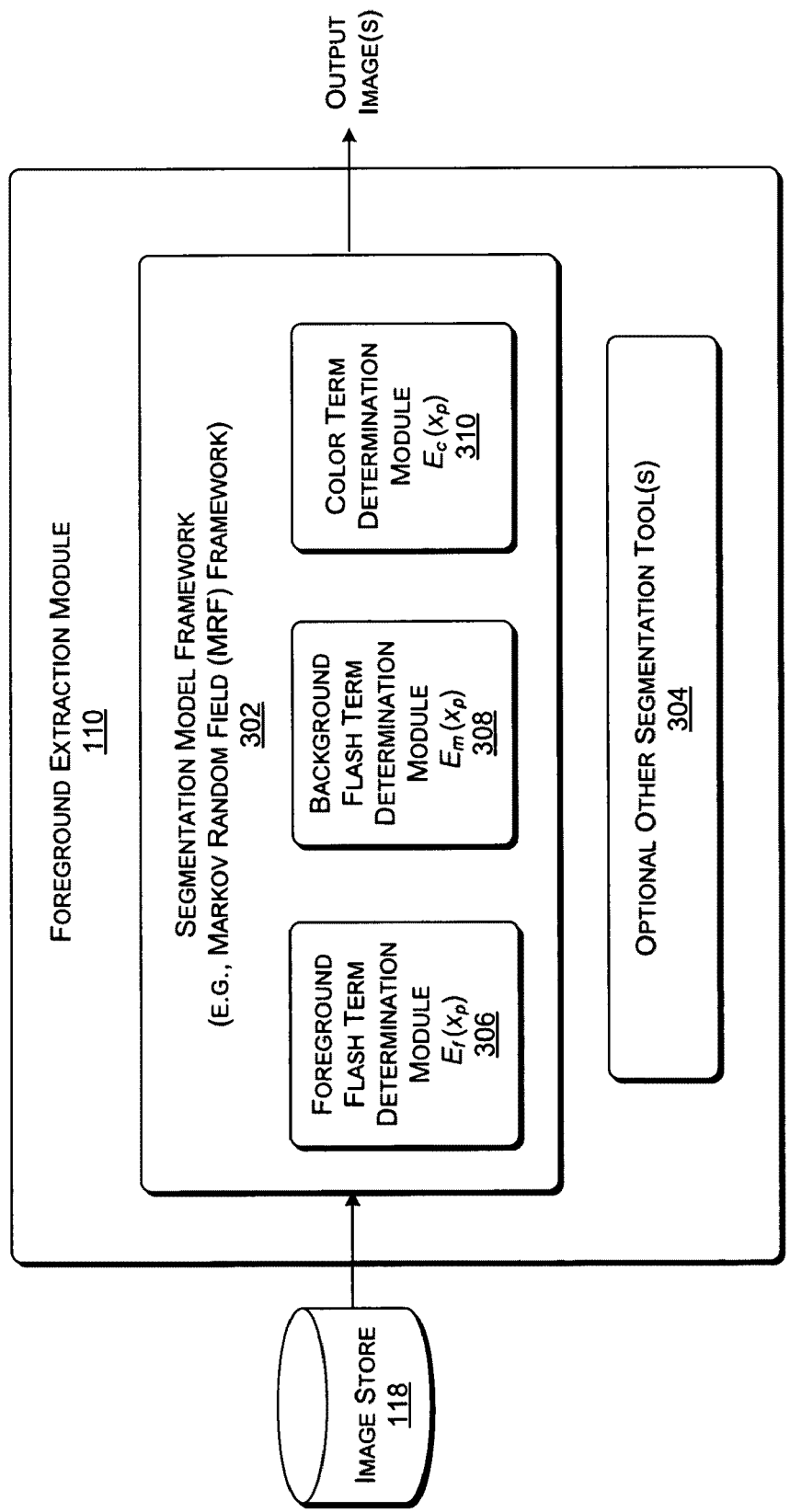
FIG. 3 shows an illustrative foreground extraction module for use in the system of FIG. 1.

FIG. 3 shows one implementation of the foreground extraction module 110 introduced in FIG. 1. By way of overview, the foreground extraction module 110 applies a segmentation model framework 302 to segment images into their component foreground/background parts. The segmentation model framework 302 accepts input images (e.g., in the form of flash/no-flash image pairings) from the image store 118 and generates output results (e.g., in the form of extracted foreground information and the like). The foreground extraction module 110 can also rely on one or more other segmentation tools 304.

The segmentation model framework 302 can itself include plural components. It can include a foreground flash term determination module 306, a background flash term determination module 308, and a color term determination module 310.

The following sections explain the above-introduced components of the foreground extraction module 110 in greater detail.

C.1. Segmentation Model Framework

In one illustrative implementation, the segmentation model framework 302 performs processing based on the following flash-illumination model. Assume that a flash is a point light source with intensity L. The radiance E of a surface point P caused by the flash is $E = L \cdot \rho r^{-2} \cdot \cos\theta$, where $\rho$ is the surface bidirectional reflectance distribution function (BRDF) under given flash and view directions, r is the distance from the flash unit, and $\theta$ is the angle between the flash direction and the surface normal at P. Hence, the flash intensity falls off quickly with distance r.

It is assumed that the background object is relatively distant compared to the foreground object and flash unit. Under this assumption, the appearance of the foreground information will be dramatically changed by the flash while the background information is only marginally changed. The no-flash image 204 and the flash image 206 (shown in FIG. 2) demonstrate this observation. The marked change in the foreground information (relative to the marginal change in the background information) caused by the flash provides a strong cue for use in the extraction of the foreground information.

In one illustrative and non-limiting approach, foreground/background segmentation can be formulated as a binary labeling problem. Given one of the two input images, i.e., a flash image $I^f$ or a no-flash image $I^{nf}$, the goal is to label pixel p as $x_p \in \{\text{background}(=0), \text{foreground}(=1)\}$. In one illustrative implementation, the foreground information is extracted by minimizing the following energy of a Markov Random Field (MRF):

$$E(x) = \sum_p E_d(x_p) + \alpha \sum_{p,q} E_s(x_p, x_q). \quad (1)$$

where $E_d(x_p)$ is a data term for each pixel p, and $E_s(x_p, x_q)$ is a smoothness term associated with two adjacent pixels p and q. The $\alpha$ parameter balances the influence of the $E_d(x_p)$ and $E_s(x_p, x_q)$ terms. In one illustrative and non-limiting case, the values used for a range between approximately 20 and 40, although other values can be used. In one illustrative implementation, equation (1) can be solved using a min-cut approach.

The smoothness term $E_s(x_p, x_q)$ penalizes the different labeling for two adjacent pixels p and q in textureless areas. It is defined as:

$$E_s(x_p, x_q) = |x_p - x_q| \cdot \exp(-\beta \|I_p - I_q\|^2) \quad (2)$$

where $\beta = (2 \langle \|I_p - I_q\|^2 \rangle)^{-1}$ and $\langle y \rangle$ denotes the expectation of y. This kind of contrast-dependent term is proposed in Y. Boykov and M. P. Jolly, "Interactive Graph Cuts for Optimal Boundary & Region Segmentation of Objects in N-D images," Proceedings of ICCV, 2001.

The data term $E_d(x_p)$ models the flash effects on the foreground, the (motion-compensated) background, and the color likelihood. It consists of three terms:

$$E_d(x_p) = \gamma_f E_f(x_p) + \gamma_m E_m(x_p) + E_c(x_p) \quad (3).$$

In equation (3), the terms $E_f$, $E_m$, and $E_c$ are defined as follows:

$E_f$ is a foreground flash term. This term has a tendency of labeling a pixel with significant appearance change as part of the foreground information. The flash term uses a color histogram of two images as a global cue (as described below in Section C.2).

$E_m$ is a background flash term. This term models the motion-compensated flash effect on the background. This term has a tendency of labeling a pixel with good matching and small appearance changes as background information. This energy term considers both flash and motion cues (as described below in Section C.3).

$E_c$ is a color term. This term models the foreground and background color likelihoods in the image. In one illustrative implementation, the foreground and background color distributions can be modeled as Gaussian Mixture Models (GMMs), (as described below in Section C.4).

$\gamma_f$ and $\gamma_m$ are constants. In one illustrative implementation, both of these values are set to 10, although other values can be used.

The segmentation model framework 302 includes three respective modules for calculating the above-described terms. Namely, the foreground flash term determination module 306 determines the foreground flash term $E_f$. The background flash term determination module 308 determines the background flash term $E_m$. The color term determination module 310 determines the color term $E_c$. The following sections provide additional information regarding the operation of these three modules (306, 308, 310).

C.2. Foreground Flash Term Calculation Module

The foreground flash term determination module 306 provides the foreground flash term $E_f$ based on the following analysis. Generally, the flash effect on the foreground information is modeled by analyzing histograms of the flash/no-flash images. This is global information regarding changes caused by flash, which is relatively insensitive to small camera and scene movements.

Let $H^f=\{h_k^f\}$ and $H^{nf}=\{h_k^{nf}\}$ be the RGB histograms of the flash image and the no-flash image, respectively; $h_k^f$ and $h_k^{nf}$ represent respective pixel counts in the kth bin of the histograms. If $h_k^{nf}>h_k^f$, some pixels in the kth bin of $H^{nf}$ are sufficiently modified by the flash and moved to other bins in $H^f$ (these bins are unknown). As a result, the pixels in this bin for the no-flash image have a higher probability of being foreground pixels. Similarly, $h_k^{nf}<h_k^f$ means that some pixels have been modified by the flash and transferred to the kth bin of $H^f$. Hence, in the flash image, the pixels in this bin have a higher probability of being foreground pixels. These observations are quantified by defining a flash ratio for each pixel p in the flash image and no-flash image as:

$$r_p^f = \max\left\{\frac{h_{k_p}^f - h_{k_p}^{nf}}{h_{k_p}^f}, 0\right\}$$

$$r_p^{nf} = \max\left\{\frac{h_{k_p}^{nf} - h_{k_p}^f}{h_{k_p}^{nf}}, 0\right\},$$

where $k_p$ is the bin index of a pixel p. The larger the flash ratio for a pixel, the higher is the probability that the pixel belongs to the foreground information.

Figure 4B:
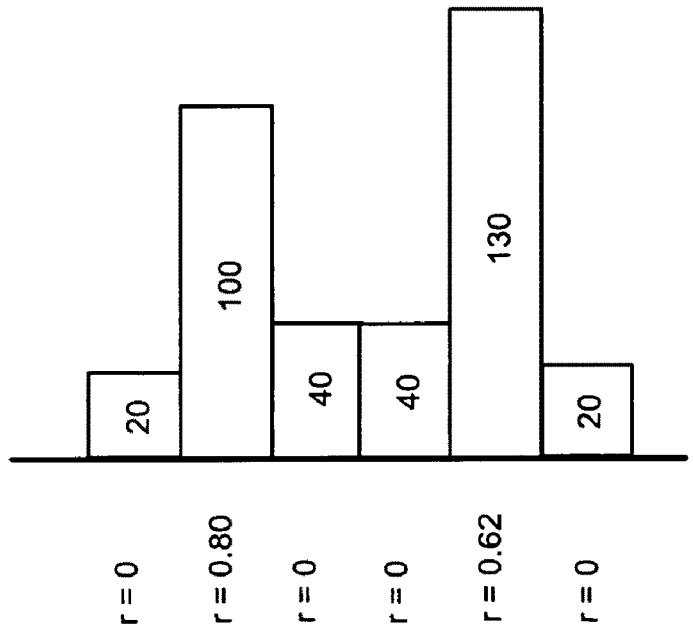
FIGS. 4A and 4B show histograms associated with a no-flash image and a flash image, respectively, used by the foreground extraction module.
Figure 4A:
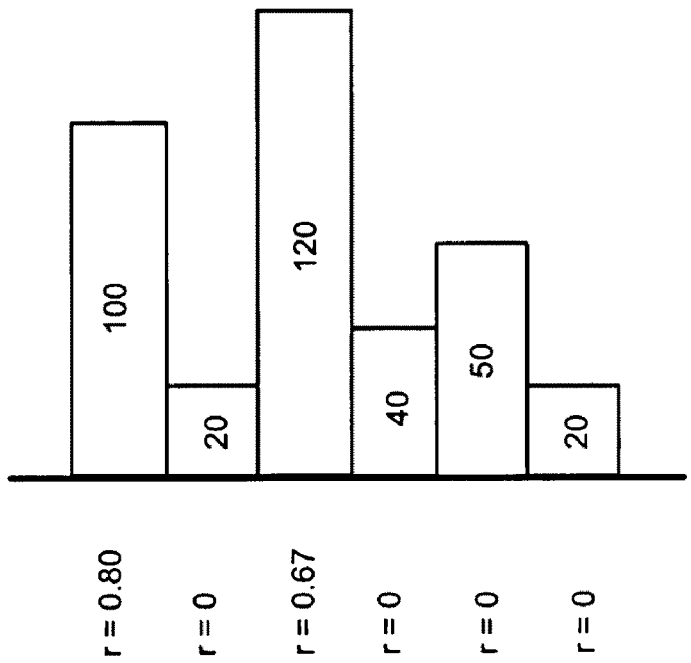

FIGS. 4A and 4B illustrate flash ratio for an exemplary flash/no-flash pair. For each histogram, the intensity increases downward, with the number of pixels indicated within each bin. The left of each bin identifies a flash ratio. In the top-most bin, there are 100 pixels in the no-flash image and 20 in the flash image. Hence, the flash ratio=(100−20)/100=0.80. In this case, 80 pixels are brightened by the flash and moved out into other bins in the flash image. For the fifth bin (from top), there is a 62% addition to the number of pixels in the flash image caused by pixels brightened by the flash.

Figure 5A:
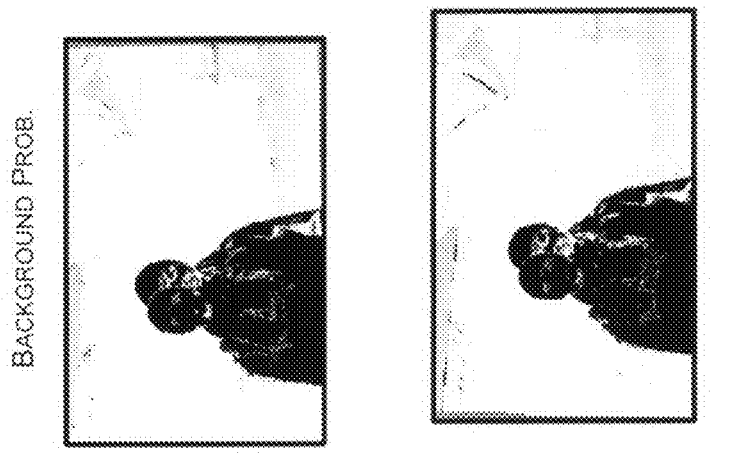
FIG. 5A shows flash ratio information used by the foreground extraction module.

FIG. 5A shows the flash ratios of the no-flash/flash image pair (corresponding to the no-flash image 204 and the flash image 206, shown in FIG. 2). Because the histogram is global, the flash ratio map may not be entirely correct. For example, the flash ratio of the ground in the no-flash image is high because the color of the ground is similar to the color of clothes in the no-flash image. The flash ratios of the black eye glasses in both images are low due to the low reflectance of this black object.

The energy term $E_f$ is defined based on the flash ratio with a robust parameter ζ as:

$$E_f(x_p) = 0 \text{ for } x_p = 1 \quad (4)$$

$$E_f(x_p) = \frac{1}{1-\varsigma}[\max\{r_p, \varsigma\} - \varsigma] \text{ for } x_p = 0.$$

In one illustrative implementation, the default value of ζ is set to 0.2, although other values can be used. The significance of this robust parameter is the following: if $r_p$ is larger than ζ, pixel p is more likely to be labeled as foreground information. Otherwise, the costs for labeling pixel p as the foreground information and background information are the same. Thus, the energy term $E_f(x_p)$ provides a conservative estimate of the foreground information.

C.3. Background Flash Term Determination Module

The background flash term determination module 308 provides the background flash term $E_m$ based on the following analysis. Suppose there is a dense motion field m={m(p)} that registers the no-flash image $I^{nf}$ to the flash image $I^f$. The flash difference between the pixel p in $I^{nf}$ and its corresponding pixel p'=m(p) in $I^f$ is:

$$\Delta I_p = I_{m(p)}^f - I_p^{nf} = I_{p'}^f - I_p^{nf} \quad (5).$$

Since the user is expected to capture the flash/no-flash images with distant background in quick succession, the appearance change of the background information is expected to be small and uniform. According to one illustrative implementation, it is thus reasonable to model the flash difference distribution of all background pixels as a Gaussian distribution $N(\Delta I_p | \mu, \sigma^2)$, with mean f and variance $\sigma^2$. Then, the probability of a pixel p belonging to the background information can be defined as:

$$p_b(x) = \exp(-\sigma_b(\Delta I_p - \mu)^2) \quad (6).$$

Figure 5B:
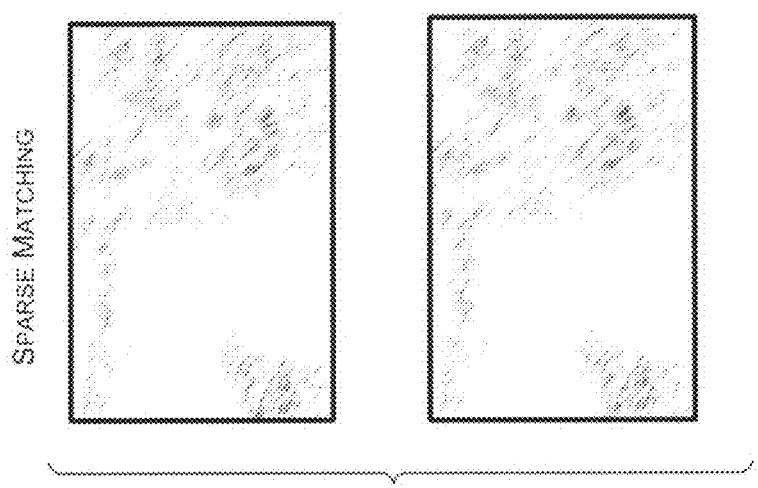
FIG. 5B shows sparse matching information used by the foreground extraction module.
Figure 5C:
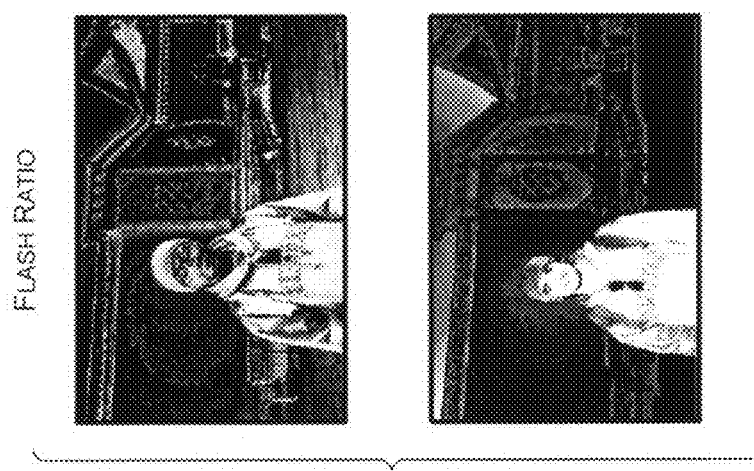
FIG. 5C shows background probability information used by the foreground extraction module.

$\sigma_b$ can be set to $\ln 2/(3\sigma)^2$ so that the pixel with flash difference within the ±3σ interval around μ will be given a higher probability ($\geq 0.5$) to be part of the background information. $p_b(x)$ is referred to herein as the background probability. FIG. 5C shows an example of background probability maps. In FIG. 5C, the brighter the pixel, the higher the probability.

Finally, the energy term $E_m(x_p)$ is defined as:

$$E_m(x_p) = 2\max\{p_b(x_p), 0.5\} - 1 \text{ for } x_p = 1$$

$$E_m(x_p) = 0 \text{ for } x_p = 0. \quad (7)$$

With this definition, $E_m(x_p)$ is normalized to be in the range [0, 1]. The energy for the flash image is similarly defined. In the above definition, it is assumed that the parameters $\{\mu, \sigma^2\}$ and the dense motion field m are known. The following subsection describes how these parameters are estimated.

Parameter Estimation

The parameters $\{\mu, \sigma^2\}$ are estimated by analyzing the one-to-one sparse feature-matching between two images. In one illustrative and non-limiting application, the one-to-one sparse feature matching can be established using a SIFT detector (e.g., as described in D. G. Lowe, "Distinctive Image Features from Scale-Invariant Keypoints," International Journal of Computer Vision, 60(2):91-110, 2004) and nearest-neighbor matching. It is appropriate that the nearest neighbor be significantly better than the second-nearest neighbor (e.g., the distance ratio threshold can be set to 0.6). The uniqueness of matching is enforced using cross-checking. FIG. 5B shows the matched sparse features for the image pair.

Figures 6A, 6B:
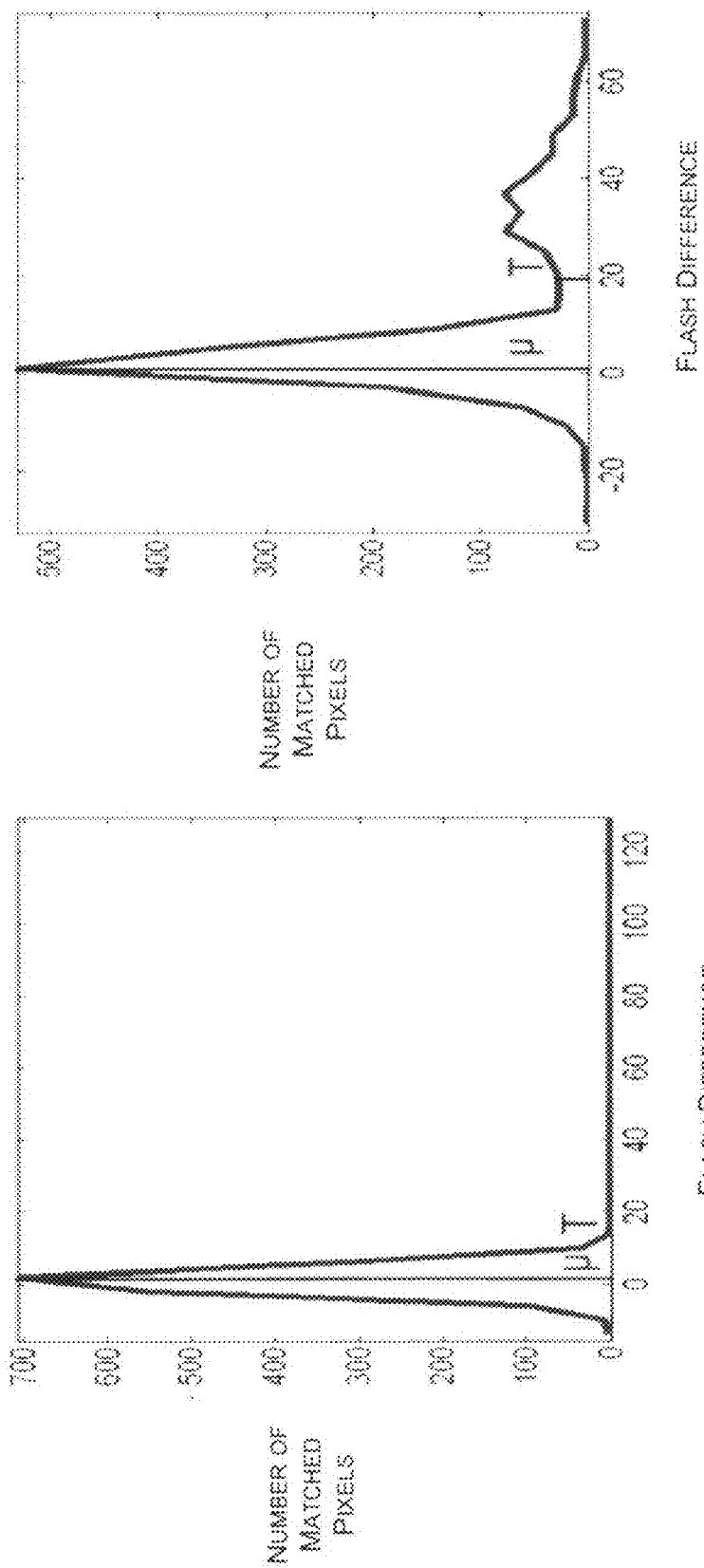
FIGS. 6A and 6B show two graphs that plot number of matched pixels with respect to flash difference information, used by the foreground extraction module.

Given matched sparse features, a 1D histogram of the flash difference is constructed. In most cases, only a few or even no matched features are from the foreground information because of the dramatic appearance change of the foreground, as shown in FIG. 5B. The corresponding flash difference histogram is shown in FIG. 6A. In some cases, the matched features come from both the foreground information and background information, resulting in multiple peaks in the histogram. For example, the histogram in FIG. 6B is constructed from the matching between the image pair in FIG. 8A. In both cases, the first local peak is of interest, which corresponds to background matches. The flash difference mean μ is estimated by the first local maximum bin in the histogram. The flash difference variance $\sigma^2$ is estimated using the matched features whose flash difference is lower than a threshold T. The threshold T is set at the first local minimum bin above it, as shown in FIGS. 6A and 6B. In one illustrative approach, the histogram can be smoothed using a Gaussian kernel to reduce noise.

To summarize, FIGS. 6A and 6B show flash difference histograms of sparse matched features for two different flash/ no-flash pairs. FIG. 6A shows a histogram with one peak, and FIG. 6B shows a histogram with multiple peaks. The parameter μ is estimated using the first maximum, and T is the first minimum to the right of μ.

Motion Estimation

Figure 7B:
FIGS. 7A and 7B show another flash image and no-flash image, respectively.
Figure 7A:
Figure 7D:
FIGS. 7C and 7D show sparse matching information associated with the flash/no-flash image pairing of FIGS. 7A and 7B.
Figure 7C:
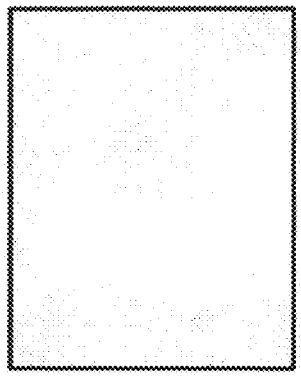

Because one purpose is to estimate the background motion, matched sparse features with flash difference above the threshold T (the same parameter discussed in the previous paragraph) are first discarded. For example, the bottom part of FIG. 5B and FIG. 7D show the background sparse matching. For the case where the background is stationary and distant, e.g., as in FIGS. 10A and 10C, a global motion model such as a homography or affine motion is sufficient to model the background motion. A global motion can be directly computed from the matched background sparse features. However, a global motion is inadequate to model dynamic background information, radially distorted images, or parallax, e.g., as indicated in the series of images in FIG. 7, which include a moderately dynamic background. In these cases, applying dense motion refinement will improve the result.

Taking the no-flash image as an example, the initial dense background motion field $m^0$ is interpolated, according to one illustrative implementation, using Adaptively Locally Weighted Regression (ALWR) (e.g., as described in D. G. Lowe, "Distinctive Image Features from Scale-Invariant Keypoints," International Journal of Computer Vision, 60(2): 91-110, 2004) using matched background sparse features. The matching residual with compensated flash difference is:

$$e_p = I_{m(p)}^f - I_p^{nf} - \mu_p \quad (8)$$

Recall that $I^f$ and $I^{nf}$ refer to the flash image and no-flash image, respectively.

For each pixel p, its initial flash difference $\mu_p$ is set as μ. Then, the motion field is iteratively refined using, according to one illustrative implementation, the Lucas-Kanade algorithm (described, for instance, in B. Lucas and T. Kanade, "An Iterative Image Registration Technique with Application to Stereo Vision," Proceedings of the Intl. Joint Conf. on Artificial Intelligence, 1981, pp. 674-679). The motion correction $\Delta m^k(p)$ in iteration k is estimated by:

$$\Delta m^k(p) = -\left( \sum_{q \in w(p)} \nabla I_{m^k(q)}^f \nabla I_{m^k(q)}^{f\,T} \right)^{-1} \sum_{q \in w(p)} \nabla I_{m^k(q)}^f e_q^k,$$

where w(p) is a 5×5 pixel window around the pixel p. After convergence, $\mu_p$ is re-estimated for each pixel locally in a 11×11 window w'(p) by:

$$\mu_p = \frac{1}{11 \times 11} \sum_{q \in w'(p)} (I_{m(q)}^f - I_q^{nf}).$$

Then, the Lucas-Kanade algorithm is run again to further refine the motion field. The iteration number is 2 or 3 in one illustrative implementation.

Figure 7F:
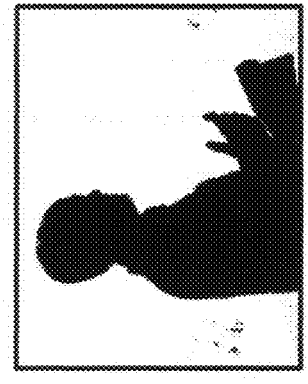
FIG. 7E shows background probability information (based on the use of homography) and FIG. 7F shows background probability information (based on the use of ALWR and refinement), corresponding to the flash/no-flash pairing of FIGS. 7A and 7B.
Figure 7E:
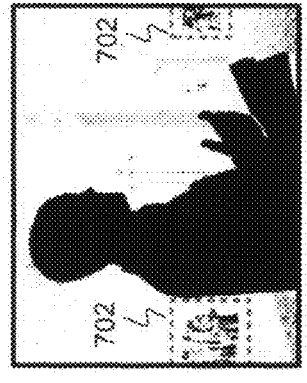

FIGS. 7E and 7F show the background probability map of the flash image by global homography, and the refined dense motion field. (The brighter the pixel, the higher the background probability.) As shown there, the background probability map is improved by the use of the motion field. Notice that while the foreground information may be incorrectly registered, it will be assigned a lower probability due to the significant foreground luminance changes.

C.4. Color Term Determination Module

The color term determination module 310 provides the color term $E_c$ based on the following analysis. In one illustrative implementation, the foreground color likelihood is modeled as Gaussian Mixture Models (GMMs):

$$p_c(I_p | x_p = 1) = \sum_{k=1}^{K} w_k^f N\left(I_p | \mu_k^f, \Sigma_k^f\right), \quad (9)$$

where N(·) is a Gaussian distribution and $\{w_k^f, \mu_k^f, \Sigma_k^f\}$ represent the weight, mean, and covariance matrix of a kth component of the foreground GMMs. The typical value of component number K is 10 in one illustrative implementation. The foreground GMMs is estimated using all pixels with $p_b(x) > 0.6$. The background color likelihood $p_c(I_p | x_p = 0)$ is similarly defined and estimated using all pixels with $p_b(x) < 0.4$. Finally, the color term $E_c(x_p)$ is defined as:

$$E_c(x_p) = -\log(p_c(I_p | x_p = 1)) \text{ for } x_p = 1$$

$$E_c(x_p) = -\log(p_c(I_p | x_p = 0)) \text{ for } x_p = 0. \quad (10)$$

The color models can be refined after minimizing the flash cut energy using the newly estimated foreground/background area. However, it is found that the improvement is marginal because the initial color models are generally accurate enough.

In summary, the series of FIG. 7 examples demonstrate motion-compensated background probability. That is, FIGS. 7A and 7B show a flash image and a no-flash image. FIG. 7C shows sparse matching. FIG. 7D shows background sparse matching, e.g., matching with flash difference lower than threshold T. FIG. 7E shows a background probability map for the flash image by using a global homography technique. Areas highlighted within red dotted rectangles 702 are areas incorrectly matched due to the background being dynamic. FIG. 7F shows a background probability map produced using the ALWR technique and refinement.

D. Results

Figures 8A, 8B, 8C, 8D:
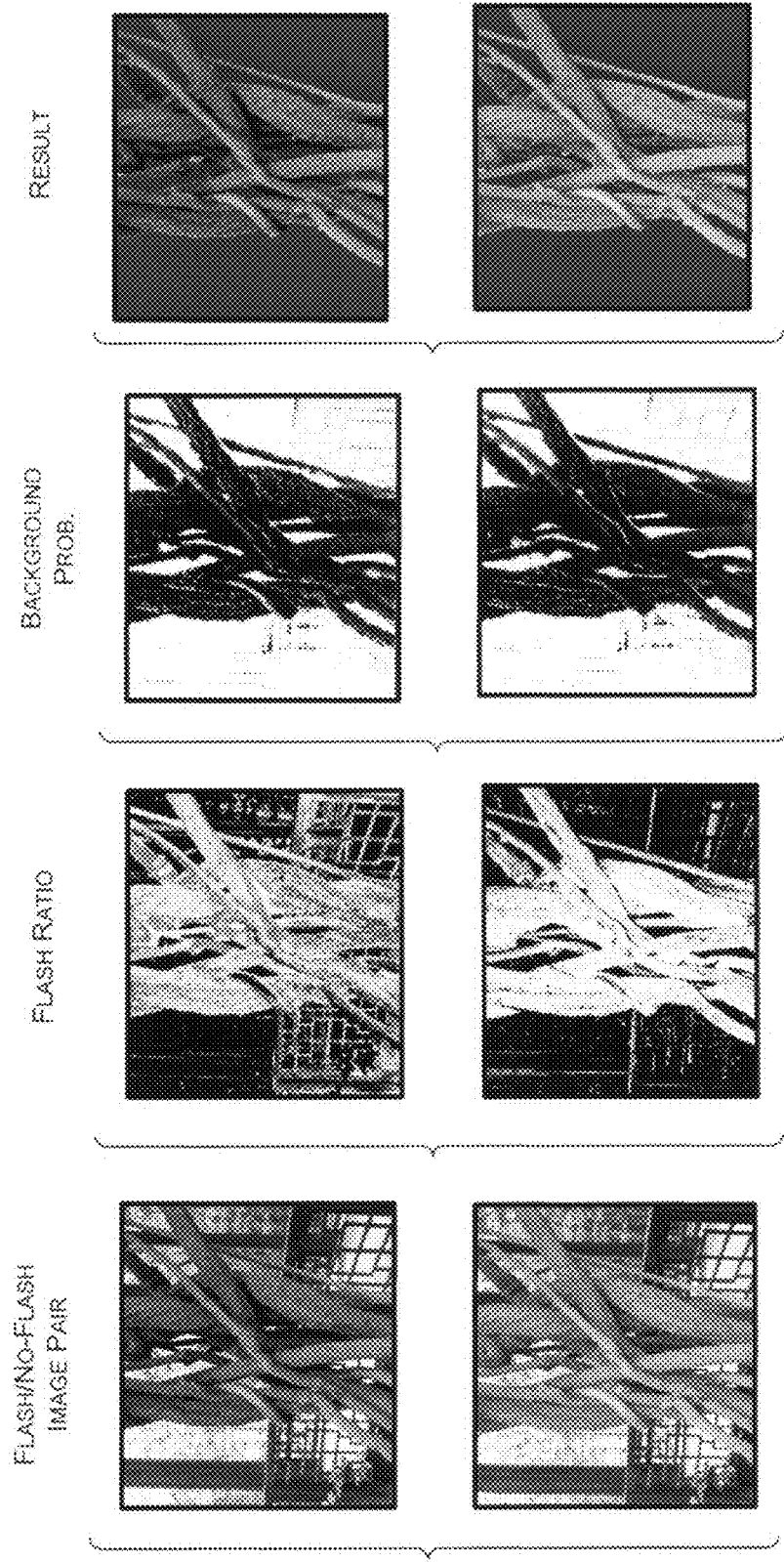
FIG. 8A shows another flash/no-flash image pairing.
FIG. 8B shows flash ratio information corresponding to the flash/no-flash image pairing of FIG. 8A.
FIG. 8C shows background probability information corresponding to the flash/no-flash image pairing of FIG. 8A.
FIG. 8D shows extracted foreground information corresponding to the flash/no-flash image pairing of FIG. 8A.
Figure 9B:
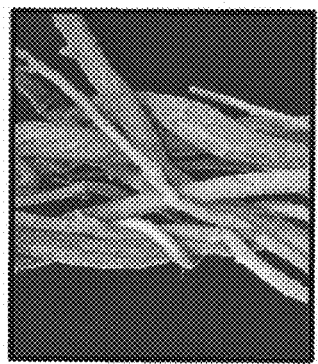
FIGS. 9A and 9B show extracted foreground information without taking into consideration one or more cues used in the processing of FIGS. 8A-8D.
Figure 9A:
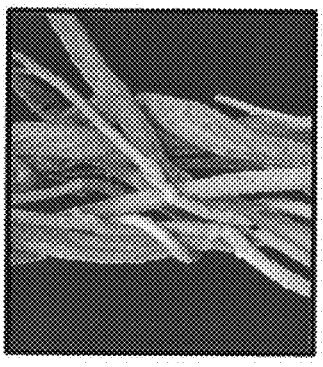

FIG. 8A shows a particular flash/no-flash image pairing. FIGS. 8B and 8C show intermediate analysis produced by the foreground extraction module 110. Namely, FIG. 8B shows flash ratio map information and FIG. 8C shows motion-compensated probability map information. FIG. 8D shows the segmentation results produced by the foreground extraction module 110. To demonstrate the contributions of the foreground flash term and background flash term, FIGS. 9A and 9B show unsatisfactory segmentation results respectively using: a) only flash ratio and color terms; and b) only background probability and color terms. The unsatisfactory results demonstrate the usefulness of combining all three cues when segmenting image information.

The series of images in FIG. 10 demonstrate additional results of the foreground extraction module 110. The image pairings in these figures correspond to a variety of indoor and outdoor scenes. For example, FIG. 10A shows an example of a walking person. FIG. 10B shows a scene that includes a moving background. FIG. 10C shows a scene having fine structure. FIG. 10D includes a scene with a foreground plant having complicated structures captured under windy conditions. FIG. 10E shows a scene with a fence in a bamboo grove; this is an example of a scene with complicated background information. FIG. 10F is a scene that includes both foreground movement and a moderately dynamic background. (Due to the limited space of this kind of indoor environment, it is appropriate to decrease the flash intensity to only light the foreground objects.) FIG. 7G shows another indoor scene.

Some other known segmentation techniques would have difficulty processing one or more of the scenes shown in FIG. 10, e.g., due to the presence of motion in the foreground and/or background information, and/or due to the complexity of the foreground and/or background information. Further, while other segmentation techniques may provide satisfactory results for some scenes, it is challenging for other segmentation techniques to consistently provide satisfactory results for the variety of different types of scenes shown in FIG. 10, which present a combination of challenges.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for extracting foreground information from image information, comprising:
  receiving a no-flash image of a subject, wherein the no-flash image corresponds to an image-capture of the subject without the use of flash;
  receiving a flash image of the subject, wherein the flash image corresponds to an image-capture of the subject with the use of flash, wherein the no-flash image and the flash image comprise image information;
  extracting foreground information from the image information based on a consideration of: flash information; motion information; and color information, wherein the flash information uses histogram analysis with help of background motion estimation;
  including a cue that pertains to motion information exhibited in the image formation, wherein the background motion information is the cue to extract the foreground information; and
  manifesting changes between the no-flash image and the flash image by the background motion information.

2. The method of claim 1, wherein the extracting comprises minimizing an energy term to extract the foreground information.

3. The method of claim 1, wherein the extracting comprises minimizing an energy term of a Markov Random Field model.

4. The method of claim 1, wherein the extracting comprises minimizing an energy term E(x), where E(x) is:

$$E(x) = \sum_p E_d(x_p) + \alpha \sum_{p,q} E_s(x_p, x_q)$$

where $E_d(x_p)$ is a data term for each pixel p in the image information, $E_s(x_p, x_q)$ is a smoothness term associated with two adjacent pixels p and q in the image information, and $\alpha$ is a constant.

5. The method of claim 1, wherein the extracting determines a foreground flash term, wherein the foreground flash term applies a color histogram associated with the image information as a global cue.

6. The method of claim 1, wherein the extracting determines a background flash term, wherein the background flash term models a motion-compensated flash effect on background information within the image information.

7. The method of claim 1, wherein the extracting determines a color term $E_c$, wherein the color term models foreground and background color likelihood measures in the image information.

8. The method of claim 1, wherein the extracting determines:
  a foreground flash term, wherein the foreground flash term applies a color histogram associated with the image information as a global cue;
  a background flash term, wherein the background flash term models a motion-compensated flash effect on background information within the image information; and
  a color term, wherein the color term models foreground and background color likelihood measures in the image information.

9. One or more computing devices, comprising:
  one or more processors; and
  memory to store computer-executable instructions that, when executed by the one or more processors, perform the method of claim 1.

10. A system for extracting foreground information from image information, comprising:
  a processing unit;
  a foreground extraction module executed by the processing unit;
  a segmentation model framework executed by the processing unit, configured to receive image information, the image information comprising a pairing of a no-flash image and a flash image, the no-flash image capturing a subject without flash and the flash image capturing the subject with flash,
  the segmentation model framework configured to process the image information to extract foreground information from the image information based on a consideration of: flash information; motion information; and color information;
  a foreground flash term determination module executed by the processing unit, configured to extract foreground information from the image information based on the flash information, the flash information uses histogram analysis with help of background motion estimation;
  a background flash term determination module executed by the processing unit, configured to extract the foreground information from the image information based on the motion information, the motion information is a cue that pertains to motion exhibited in the image information; and
  a color term determination module executed by the processing unit, configured to extract the foreground information from the image information based on the color information, the color information is a cue that pertains to distribution of color information in the image information and to manifest changes between the no-flash image and the flash image.

11. The system of claim 10, wherein the segmentation model framework being further configured to extract foreground information by minimizing an energy term.

12. The system of claim 10, wherein the segmentation model framework being further configured to extract foreground information by minimizing an energy term of a Markov Random Field model.

13. The system of claim 10, wherein the segmentation model framework being further configured to extract foreground information by minimizing an energy term E(x), where E(x) is:

$$E(x) = \sum_p E_d(x_p) + \alpha \sum_{p,q} E_s(x_p, x_q)$$

where $E_d(x_p)$ is a data term for each pixel p in the image information, $E_s(x_p, x_q)$ is a smoothness term associated with two adjacent pixels p and q in the image information, and α is a constant.

14. The system of claim 10, wherein the foreground flash term determination module being further configured to determine a foreground flash term, wherein the foreground flash term applies a color histogram associated with the image information as a global cue.

15. The system of claim 10, wherein the background flash term determination module being further configured to determine a background flash term, wherein the background flash term models a motion-compensated flash effect on background information within the image information.

16. The system of claim 10, wherein the color term determination module being further configured to determine a color term, wherein the color term models foreground and background color likelihood measures in the image information.

17. A method for extracting foreground information, comprising:
receiving a no-flash image of a subject, wherein the no-flash image corresponds to an image-capture of the subject without the use of flash;
receiving a flash image of the subject, wherein the flash image corresponds to an image-capture of the subject with the use of flash, wherein the no-flash image and the flash image comprise image information; and
extracting foreground information from the image information by minimizing an energy term E(x), where E(x) is:

$$E(x) = \sum_p E_d(x_p) + \alpha \sum_{p,q} E_s(x_p, x_q)$$

where $E_d(x_p)$ is a data term for each pixel p in the image information, $E_s(x_p, x_q)$ is a smoothness term associated with two adjacent pixels p and q in the image information, and α is a constant,
where $E_d(x_p)$ is:

$E_d(x_p) = \gamma_f E_f(x_p) + \gamma_m E_m(x_p) + E_c(x_p)$ where $E_f(x_p)$ is a foreground flash term, wherein the foreground flash term applies a color histogram associated with the image information as a global cue;
$E_m(x_p)$ is a background flash term, wherein the background flash term models a motion-compensated flash effect on background information within the image information;
$E_c(x_p)$ is a color term, wherein the color term models foreground and background color likelihood measures in the image information; and
$\gamma_f$ and $\gamma_m$ are constants.

18. One or more computing devices, comprising:
one or more processors; and
memory to store computer-executable instructions that, when executed by the one or more processors, perform the method of claim 17.

* * * * *